United States Patent [19]

Barbeau

[11] Patent Number: 4,697,238

[45] Date of Patent: Sep. 29, 1987

[54] INTEGRATED FUEL MANAGEMENT SYSTEM

[75] Inventor: Dennis E. Barbeau, Temperance, Mich.

[73] Assignee: Teledyne Industries, Inc., Los Angeles, Calif.

[21] Appl. No.: 578,595

[22] Filed: Feb. 10, 1984

Related U.S. Application Data

[62] Division of Ser. No. 226,632, Jan. 21, 1981, Pat. No. 4,441,156.

[51] Int. Cl.⁴ .............................................. G06F 15/20
[52] U.S. Cl. ........................... 364/431.02; 60/39.281; 60/243
[58] Field of Search ................ 364/431.02; 60/39.281, 60/243

[56] References Cited

U.S. PATENT DOCUMENTS

| | | | |
|---|---|---|---|
| 3,098,632 | 7/1963 | Christenson | 244/135 |
| 3,261,571 | 7/1966 | Pinnes | 244/1 |
| 3,275,061 | 11/1966 | Williams et al. | 158/36.4 |
| 3,279,522 | 10/1966 | Norris et al. | 158/36.4 |
| 3,389,602 | 6/1968 | Clemens | 73/290 |
| 3,443,778 | 5/1969 | Sanz | 244/135 |
| 3,758,764 | 9/1973 | Harner | 364/431.02 |
| 3,946,551 | 3/1976 | Linebrink et al. | 60/39.28 R |
| 4,033,115 | 7/1977 | Baits | 60/39.28 R |
| 4,038,817 | 8/1977 | Snow et al. | 60/204 |
| 4,115,998 | 9/1978 | Gilbert et al. | 60/39.28 R |
| 4,159,625 | 7/1979 | Kerr | 364/431.02 |
| 4,188,781 | 2/1980 | Johnson et al. | 60/39.28 R |
| 4,208,871 | 6/1980 | Riple, Jr. | 60/39.28 R |
| 4,215,412 | 7/1980 | Bernier et al. | 364/431.02 |
| 4,248,042 | 2/1981 | Larsen et al. | 364/431.02 |
| 4,294,069 | 10/1981 | Camp | 364/431.02 |

FOREIGN PATENT DOCUMENTS 2841750  9/1978  Fed. Rep. of Germany ........................ 364/431.02

OTHER PUBLICATIONS

Ringel et al., Use of Microprocessors to Control and Monitor Operations of Gas Turbine Generators, IEEE Trans. on Ind. Elect. and Control Instrumentation, vol. IECI-23, No. 3, Aug. 1976, pp. 238-248.

Primary Examiner—Charles E. Atkinson
Attorney, Agent, or Firm—Gifford, Groh, VanOphem, Sheridan, Sprinkle and Dolgorukov

[57] ABSTRACT

A low cost, integrated, aircraft fuel management system. A system control unit receives engine variable signals and provides a signal to a motor control unit which thereby controls a variable speed motor. The motor drives a positive displacement pump which delivers and meters fuel to a slinger type turbine engine capable of handling slurry fuels. In a preferred embodiment, compressor discharge pressure (CDP) is supplied to the airframe fuel reservoir thereby pressurizing the fuel supply and minimizing the power requirements of the motor driving the fuel pump.

9 Claims, 2 Drawing Figures

4,697,238

INTEGRATED FUEL MANAGEMENT SYSTEM

This application is a division of application Ser. No. 226,632, filed Jan. 21, 1981, now U.S. Pat. No. 4,441,156, issued Apr. 3, 1984.

BACKGROUND OF THE INVENTION

I. Field of the Invention

The present invention relates to fuel management systems for aircraft using turbine enegines.

II. Description of the Prior Art

Turbine engines are frequently used for aircraft, especially unmanned aircraft of relatively small size. Minimizing the number and size of components for such aircraft has been a constant challenge to engineers and designers for such systems. Therefore, it has been proposed in the past to use systems which are as fully integrated as possible and which require little or no supply and control from external sources.

A particular problem in this area has been the duplication of functions and equipment for various systems of the aircraft. Such duplication increases the weight and size of aircraft components and in the case of some unmanned aircraft, the overall size of the craft. An additional problem in the past has been the inexpensive provision of a suitable engine which is capable of handling any of various fuels for propulsion.

Since unmanned aircraft and some manned aircraft require a great range of operation, fuel efficiency has been an overall design concern. In the past, efforts have been made to determine the most efficient fuel flow rte for a given aircraft in accordance with its airframe, weight requirements, and other factors. A problem inherent with specifying such an optimum fuel flow rate is that the aircraft is not thereafter responsive to variables which affect the airframe as well as engine operating variables. Thus, all of the above problems have added to the overall cost of providing such an aircraft with the proper fuel flow control while maintaining acceptable operating standards.

SUMMARY OF THE PRESENT INVENTION

The present invention is a low cost, fuel efficient aircraft fuel management system for supplying and regulating the fuel flow in an aircraft to a turbine propulsion system. The fuel management system preferably utilizes a variable speed motor to control a fuel pump such that the fuel supply rate is varied according to predetermined parameters. These predetermined parameters include engine operating conditions, preprogrammed instructions from an onboard computer, and flight conditions. Preferably, the air compressor associated with the turbine engine is suitably adapted to pressurize the fuel reservoir of the fuel management system such that the fuel pump has a minimum power requirement.

The turbine engine system of the present invention is preferably of the fuel slinger type which has fuel entering the combustor of the turbine through the rotating shaft of the turbine. Operating condition signals from the engine and the airframe are directed to a central control so as to vary the speed of the motor thereby metering the fuel through the positive displacement or similar fuel pump.

It is, therefore, an object of the present invention to provide a fuel management system which regulates fuel from a fuel reservoir in an airframe to a turbine powering the aircraft.

It is also an object of the present invention to provide an efficient low cost fuel flow management system wherein the supply of fuel from the aircraft reservoir to the engine is responsive to engine variables, airframe requirements, or other predetermined signals.

It is also an object of the present invention to provide the fuel management system having a central controller which receives input signals from the aircraft engine, airframe, and other sources to efficiently control the flow of fuel to the engine.

It is also an object of the present invention to provide a variable speed motor which controls a positive displacement fuel pump to thereby meter fuel to the engine of an aircraft system.

It is also an object of the present invention to utilize the compressor associated with the turbine engine of the aircraft to pressurize the fuel tank associated with the aircraft fuel management system so as to minimize the power requirements of a variable speed motor which controls the fuel pump.

It is also an object of the present invention to provide an efficient low cost, fuel management system which eliminates duplication of equipment between the fuel management system and the airframe and integrates the airframe and engine requirements.

It is also an object of the present invention to provide a low cost, fully integrated fuel management system for an aircraft using a digital computer supplied with an airframe demand signal and sensor input signals, and providing an output signal to a motor controlled fuel pump.

It is also an object of the present invention to provide an aircraft fuel management system which will handle a variety of fuels including slurry type fuels and high heat content fuels such as those required for missile applications.

It is, therefore, also an object of the present invention to provide a fuel management system for an aircraft, especially an unmanned aircraft with a turbine engine having a rotating shaft with relatively large fuel slinger holes that do not clog when handling slurry fuels, unlike previously known fuel management systems which had metering valves and atomizing systems that tended to clog with contaminants at critical orifices.

A better understanding of these and other objects of the present invention will be had upon the reading of the following description when read in conjunction with the accompanying drawings of a fuel management system according to the present invention.

DETAILED DESCRIPTION OF A PREFERRED EMBODIMENT OF THE PRESENT INVENTION

Figure 1:
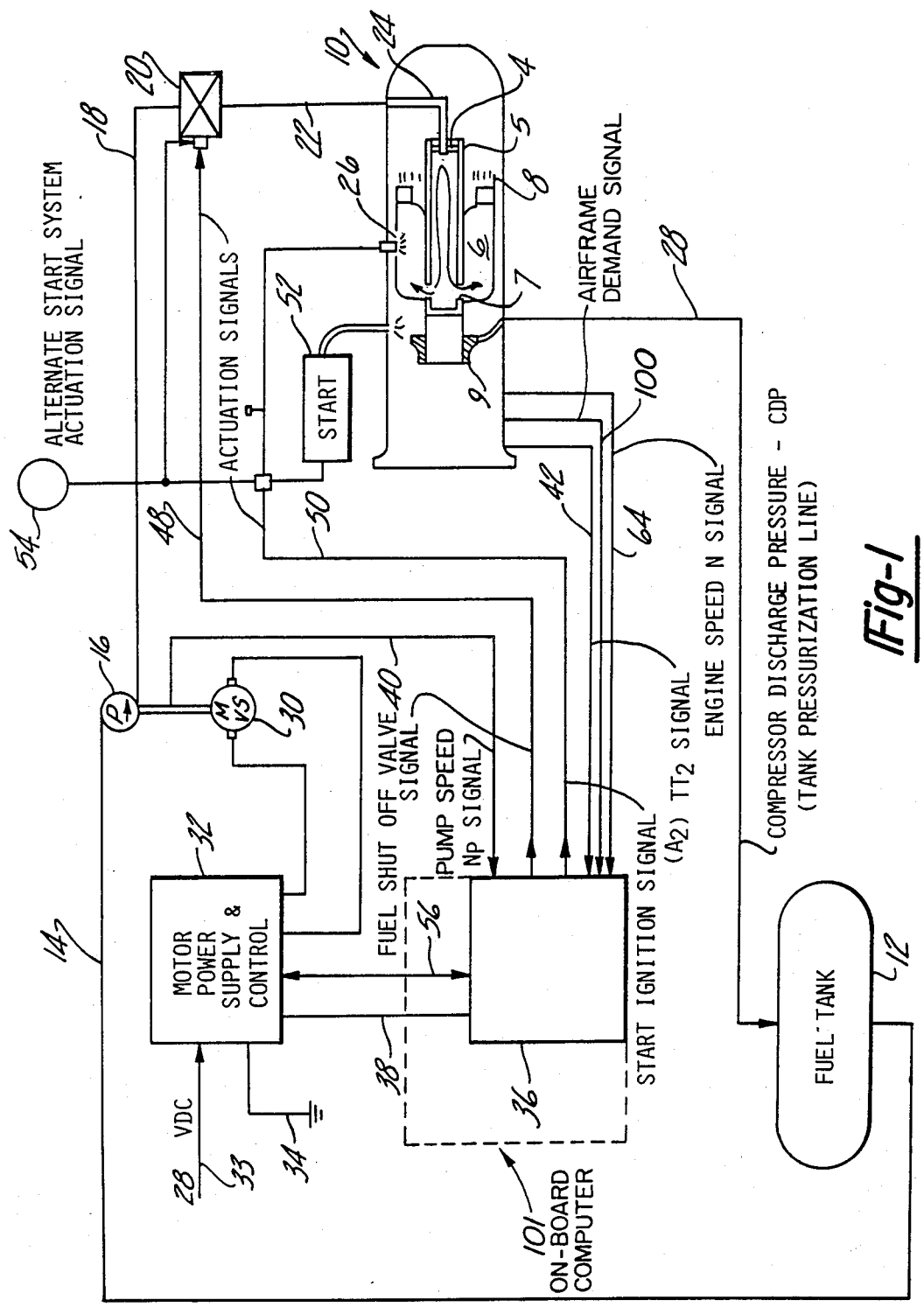
FIG. 1 is a schematic representation of a preferred embodiment of the fuel management system of the present invention with major components of the fuel management system of an unmanned aircraft labeled for clarity.

The fuel management system of the invention as represented in a preferred embodiment shown in FIGURE L, is designed to minimize the number of subsystems required to supply and control fuel from an airframe reservoir to a gas turbine propulsion system engine. The preferred embodiment shown is of the type which integrates airframe requirements and engine requirements into a single system and eliminates duplication of functions between engine related equipment and airframe related equipment. The system is of relatively low cost and is capable of handling a wide range of types and qualities of fuel including slurry fuels and fuels other than conventional petroleum based fuels, which other fuels have a high heat content per volume such as is demanded by missile applications.

Although a preferred embodiment of the invention is shown in the drawing figures, many variations of the system are possible.

The drawing figures show an airframe depicted at 10 in the form of a small missile. A fuel tank 12 is formed as part of the airframe and supplies fuel through line 14 to a positive displacement fuel pump 16. Pump 16 provides fuel to the engine through line 18, shut off valve 20, line 22, and stationary fuel supply tube 24 which is fixed to airframe 10. Fuel is thereafter supplied from tube 24 into the turbine engine by way of a seal 4. Valve 20 may be located either ahead of or behind pump 16.

The turbine engine is of the slinger type with a rotating shaft 5 extending through the combustor 6 and having slinger holes 7 circumferentially disposed in the shaft 5 underneath the primary zone of combustor 6. The slinger holes 7 are of sufficient size that they allow the use of slurry fuels and other types of fuels not available for use with conventional aircraft fuel handling systems. Slurry fuels tends to deposit the solid component in small recesses thereby rendering conventional metering valves and fuel atomizing systems inoperable. The slinger holes 7 of the rotating shaft 5 of the turbine depicted in the preferred embodiment of the drawing are of the size that overcome this problem previously present in the prior art. Thus, the holes are of a predetermined size to avoid build up of contaminants therein. Also, the pump 16 is preferably of a positive displacement type which also is readily capable of handling slurry fuels and other fuels having particles therein.

A vaporizer or atomizer combustion system may be used instead of the slinger, but in that case a higher fuel supply pressure will be required. Such higher pressures may be supplied by either the motor driven pump or an engine driven pump as explained in more detail below (see FIG. 2).

Fuel entering the rotating shaft 5 (FIG. 1) forms a thin film along the walls of the shaft 5 and discharges the film as rings of fuel through the combustor 6 in a manner effecting combustion. The fuel enters the combustor 6 at a high velocity imparted by the peripheral velocity of the slinger holes 7 so as to be efficiently burned and discharged through the turbine 8 and drive the associated compressor 9. The slinger shaft turbine 8 is especially suitable for use with the present fuel control system.

An ignitor is directed into the combustor at 26 and may be controlled by means internal to the aircraft frame 10 or by external means.

The fuel slinger of the turbine 8 is of sufficient size and rotational speed such that the fuel enters the combustor 6 at a dynamic pressure higher than exists within the combustor. Thus, since the rotating shaft 5 is a significant force injecting fuel into the combustor 6, the pump 16 need only be of a size and horsepower sufficient to provide the fuel under a small amount of pressure at seal 4 of turbine 8. Additionally, some of the gas pressurized by the compressor 9 is diverted to line 28 and fuel tank 12 so as to maintain the fuel under a constant pressure for supply to pump 16. In this manner, the pump 16 need only be of sufficient power to overcome the friction associated with flow through the lines and valves between tank 12 and seal 4, plus or minus any difference between compressor discharge pressure (CDP) and the pressure within the fuel tank 12.

A pressure regulator 29 may be provided in line 28 (FIG. 2) to reduce fuel tank pressure. This advantageously reduces the cost of the tank 12. Greater power will be required to drive the pump 16 and an engine driven pump 13 proves to be more advantageous in such a construction.

The positive displacement fuel pump 16 in FIG. 1 is driven by a variable speed motor 30 which is controlled by a motor power supply and control unit 32 of electrical, hydraulic, pneumatic or other type, preferably electrical. In the preferred embodiment shown, the motor controller 32 is supplied with a 28 volt DC input at 33 and is grounded at 34. Power is also supplied from the 28 volt DC supply 33 through the motor power supply and controller 32 to the central system control unit or computer 36 by way of line 38.

Figure 2:
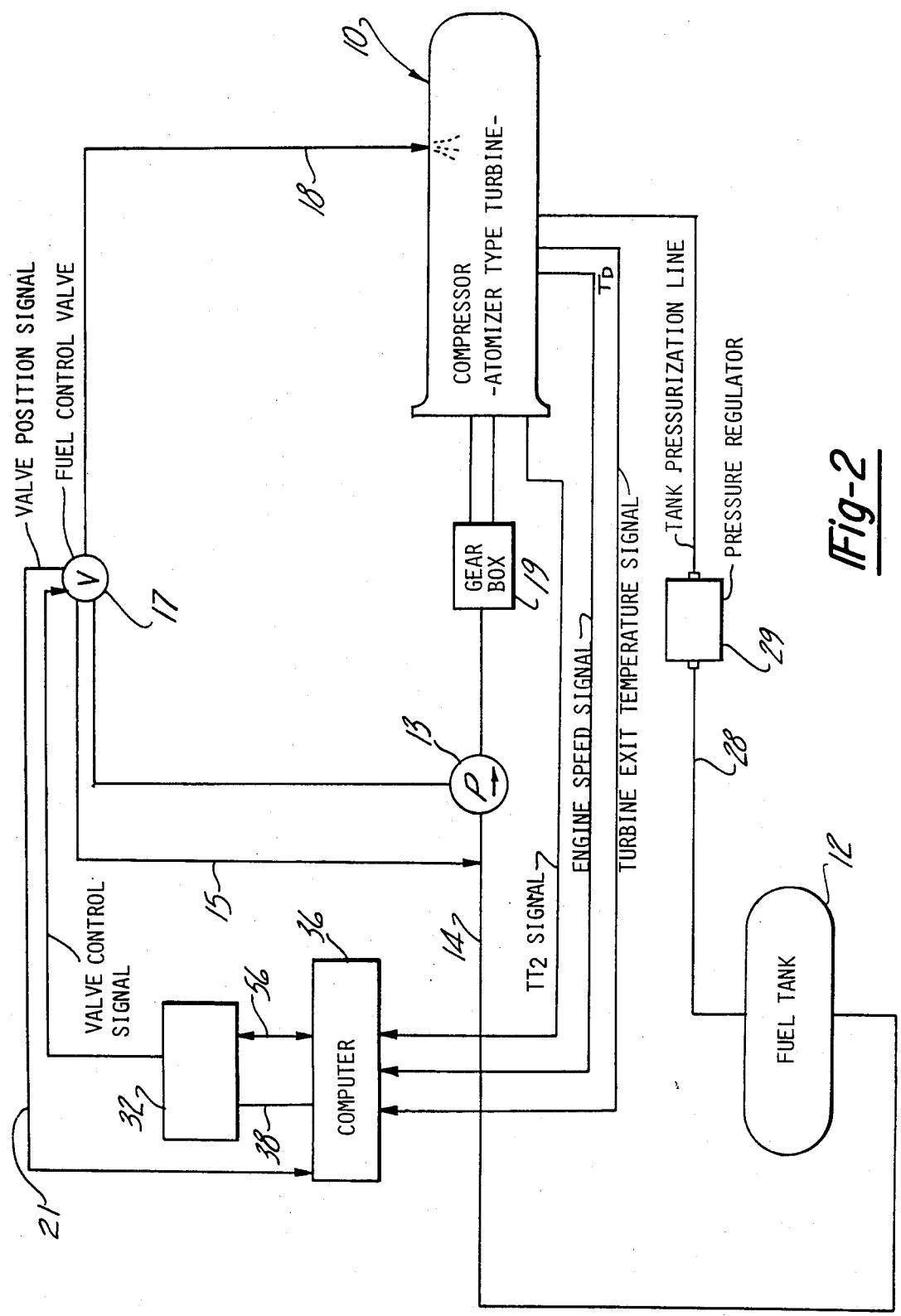
FIG. 2 shows an alternative embodiment of the present invention.

As shown in FIG. 2, the pump 13 and motor may alternatively be of the constant speed type in which case a fuel control valve 17 must be added and the controller modulates the valve position "X" via control line to control the fuel flow rate. Such a valve 17 will form a variable restriction in line 18 if a centrifugal pump is used, or will bypass excess fuel from line 18 to line 14 via line 15 if a positive displacement pump is used. If a centrifugal pump is used, a fuel control valve is required.

Since the positive displacement pump 16 is controlled by a variable speed motor 30, the pump 16 also acts as a metering valve according to the rotational speed of the motor 30 such that the flow (and thereby the remaining supply) of fuel may be regulated and measured. Such a measurement can be supplied to the central system control unit 36 by a signal via line 40 which indicates the rotational speed of the motor 30 and thereby the directly proportional fuel flow from pump 16. In summary then, the pump speed ($N_p$) indicates the rate of fuel flow to the turbine engine by providing a signal which also allows calculation of fuel remaining in fuel tank 12.

The turbine engine may provide the pump drive, either by means of shaft 5 at shaft speed as a direct drive or through a gear box 19 driven by shaft 5 at any required speed ratio. This option requires the use of a fuel control valve 17 in line 18 as indicated above and shown in FIG. 2.

Central system control unit or computer 36 is also supplied, in the preferred embodiment shown in the drawings, with sensor input signals comprising the inlet total temperature (TT2) 42, the airframe demand 100, and the engine rotational speed (N) 64.

Although the central system control unit or computer 36 is not described in detail herein, it is possible to provide any of various types of control units including microprocessors, small programmable computers, and the like. Optionally and preferably, the computer system 36 is not dedicated to the fuel management system but forms part of the existing airframe control 101 for the other required functions such as navigation and guidance. In this manner, duplication of control units for fuel management and other airframe systems is eliminated. This in turn lowers the cost of such systems since control intelligence is normally a major cost element. A digital computer is preferred but analog and various hybrid types of computers or processors are also adequate for construction of the invention in accordance with the scope and spirit of the invention.

If a fuel control valve 17 is used, then either a valve position indicator 21 (FIG. 2) must be substituted for the pump speed indicator to measure fuel flow rate, or a different engine transient control algorithm and signal (such as, for example, turbine discharge temperature $T_D$) should be used.

The system control unit 36 provides engine start and stop signals as well where desired. For example, in accordance with the preferred embodiment shown in the drawing, the fuel flow may be either restricted or shut off by fuel shut off valve 20 in accordance with a signal delivered thereto by the system control unit 36 via a signal line 48. Similarly, ignition signals may be presented via line 50 to a start motor or other device providing ignition and start up functios via starter 52 and ignition device 26.

As indicated above, starting or stopping the turbine engine propulsion system of the pre 36 provides a signal to control unit 32 which effects acceleration of the aircraft frame 10 to stable flight conditions and thereafter supplies fuel to the propulsion system of the aircraft to achieve a predetermined or variably controlled idle speed suitable for the intended mission of the aircraft. Thus, the airframe 10 may provide input signals ot the central system control unit 36 via signal line 100 such that the control unit 36 emits an actuation signal to motor control unit 32 for maintaining the air frame 10 at a proper idle speed for the engine or at proper airframe altitude, air speed, or other predetermined flight condition. The rate of change of engine speed must necessarily be controlled in some circumstances. The predetermined value represented by $N/\sqrt{TT2}$ may be monitored to control the rate of change of the engine speed with time and to prevent instability in the compression as a result of too rapid a rate of change of fuel flow.

The maximum engine operating conditions can similarly be controlled according to operational and design characteristics of the turbine and the air frame. Of course it should be understood that the expressio $N/\sqrt{TT2}$ has been empirically determined as a proper expression of the operating characteristics for the engine. This expression may be calibrated for a normal operation curve and programmed into the computer system associated with the airframe.

It can readily be appreciated that once the aircraft is at a steady state condition in flight, variations in the characteristics of the atmosphere in which the aircraft may be programmed to fly, may be compensated for by emission of the actuation signal through line 56 to motor control unit 32 in accordance with a demand signal established by the guidance computer 101 associated with the airframe.

An especially preferred form of the invention comprises a central system control unit 36 supplied with:

(a) an analog engine inlet total temperature signal (TT2);
(b) a digital engine rotational speed signal (N);
(c) a digital airframe demand signal;
(d) a turbine exit temperature signal; and
(e) a digital valve position signal.

In such an embodiment, a calibration curve can be programmed into the digital central system control unit 36 and, with $N_p$, can be used to monitor and control fuel flow rate in a closed loop system and, necessarily, the engine.

Thus, the present invention provides an improvement in cost efficienty over the prior art by providing a fuel efficient system which avoids duplication of components. Especially advantageous are the provision of compressor discharge pressure (CDP) to the fuel tank 12 thereby minimizing the power requirements of motor 30 to positive displacement pump 16. Furthermore, the provision of positive displacement pump 16 in such a system is considered to be advantageous in that, not only are various types of fuels usable with the system including slurry fuels, but the pump 16 and associated variable speed motor 30 may thereby be used to provide a signal to the central system control unit 36 so as to not only regulate the flow of fuel but to otherwise meter the fuel through the pump 16. This is possible because the rate of fuel flow through pump 16 is directly proportional to the speed of the variable speed motor 30.

Having described my invention, it will be apparent to those skilled in the art that the structure, components, control unit, and other features of the invention may be altered to provide the efficient, low cost fuel management system of the present invention without departing from the scope or spirit of the invention as defined by the appended claims.

What I claim is:

1. An aircraft fuel management system to regulate fuel from an airframe reservoir, said system comprising:
    an aircraft turbine engine having a combustor providing propulsion for the aircraft;
    a fuel pump receiving fuel from the reservoir and supplying fuel to the turbine engine;
    a motor controlling said pump so as to provide fuel to said turbine engine;
    means for sensing at least one engine condition;
    means responsive to said sensing means for controlling fuel flow to said turbine engine, and
    wherein said pump and said motor are of the constant speed type and further comprising valve means for controlling the fuel flow rate to said turbine engine and wherein said controlling means modulates the position of said valve means.

2. The invention as defined in claim 1 and further comprising a compressor driven by said turbine wherein the reservoir is pressurized by said compressor to provide fuel flow to said turbine engine thereby reducing the power required to drive said pump.

3. The invention as defined in claim 1 wherein said sensing means comprises:
    first means for sensing engine inlet total temperature;
    second means for sensing engine speed; and
    third means for sensing pump speed.

4. The invention as defined in claim 3 and further comprising stationary supply tube means for supplying fuel to said rotating shaft and means for sealing fuel flow from said tube means to said shaft.

5. The invention as defined in claim 1 and further comprising first means for generating an airframe demand signal, said controlling means being responsive to said first generating means.

6. The invention as defined in claim 1 wherein said engine further comprises a rotating shaft receiving fuel from said pump, said shaft having at least one slinger hole releasing fuel to said combustor.

7. The invention as defined in claim 1 wherein said controlling means comprises a microprocessor.

8. The invention as defined in claim 1 and further comprising second means for generating a signal to start said engine and means responsive to said second means for starting said engine.

9. The invention as defined in claim 1 wherein said sensing means also senses the position of said valve means.

* * * * *

UNITED STATES PATENT AND TRADEMARK OFFICE
CERTIFICATE OF CORRECTION

PATENT NO. : 4,697,238

DATED : September 29, 1987

INVENTOR(S) : Dennis E. Barbeau

It is certified that error appears in the above-identified patent and that said Letters Patent is hereby corrected as shown below:

Column 1, line 33, delete "rte" and insert -- rate --.
Column 3, line 30, delete "tends" and insert -- tend --.
Column 5, line 19, delete "functios" and insert -- functions --.
          line 22, delete "pre" and insert -- present invention may also be accomplished externally by means represented schematically at 54. It should also be realized that the system controls unit 36 may be used to control the ignition 26 and fuel shut off valve 20. The system control unit --;
Column 5, line 27, delete "ot" to -- to --.
          line 42, delete "expressio" and insert -- expression --.
          line 68, delete "efficienty" and insert -- efficiency --.

Signed and Sealed this

Sixteenth Day of February, 1988

Attest:

DONALD J. QUIGG

*Attesting Officer*       *Commissioner of Patents and Trademarks*